O. Reifurth &
A. Möller, INVENTORS

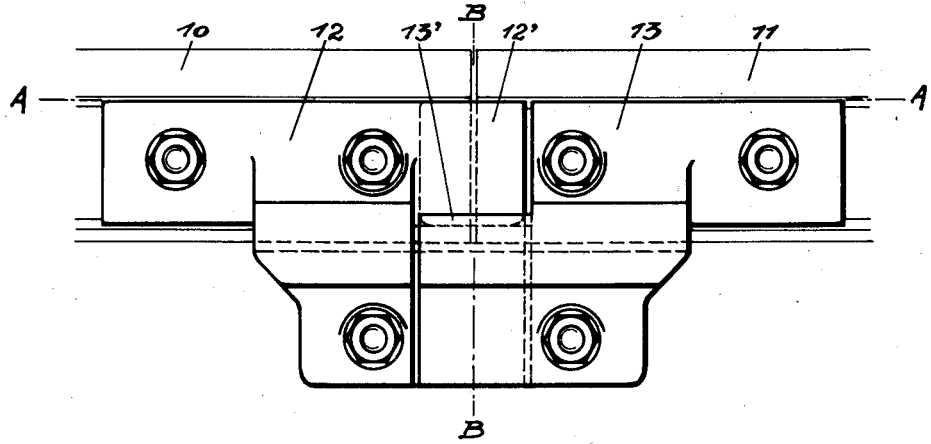
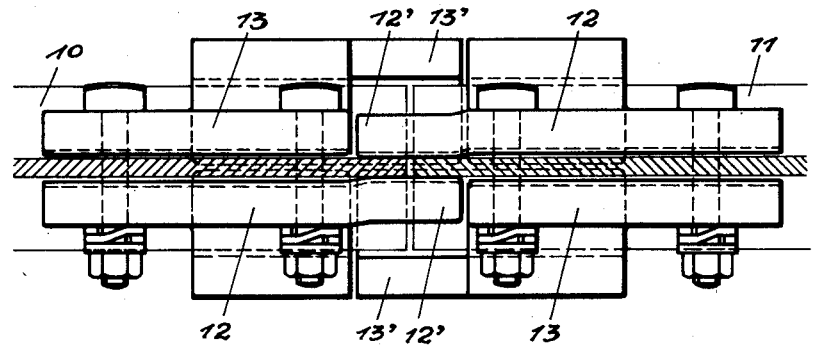
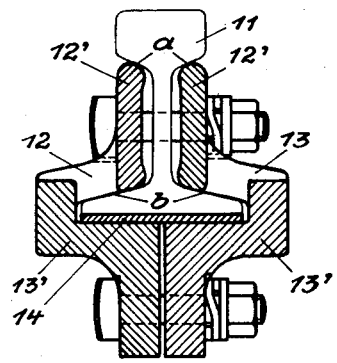

By: Marks & Clerk
Attys.

Patented July 18, 1933

1,919,131

UNITED STATES PATENT OFFICE

OTTO REIFURTH, OF IMMIGRATH, AND ALFRED MÖLLER, OF RECKLINGHAUSEN, GERMANY

RAIL-JOINT CONNECTION

Application filed February 9, 1932, Serial No. 591,854, and in Germany February 14, 1931.

This invention relates to a rail-joint connection, in which the connecting fish plates consist of two parts, which engage round the rail foot, and are bolted together above and below the latter.

The invention consists in constructing one of the associated halves of the fish plate or splice bar as a guiding fish plate, and the other as a supporting fish plate, in such a way that the guiding fish plates above the rail foot and the supporting fish plates below the rail foot, at their adjacent ends, have prolongations projecting partly beyond the end of the rail and engaging over one another in the closed position, of which the lower projections provide for the simultaneous supporting of the two rail ends, and the upper projections provide for the lateral guidance thereof. The associated guiding and supporting fish plates are preferably so connected with one another as to be yielding in the longitudinal direction, as a result of which, notwithstanding the subdivision of the connecting fish plates, a connection acting as a closed unit is obtained, but the halves of the fish plates, when the rails expand or contract, can slide relatively to one another to the required extent and can therefore be rigidly connected with the rails.

A further important advantage of the new rail-joint connection consists in the fact that it ensures the wheels passing over the rail joint without shock, since when one end of a rail sinks, owing to the bearing thereof on the extension of the supporting fish plate of the opposite rail end, the latter is pulled down with it to the same extent, and is thereby always kept at the same level as the other rail end. Furthermore the new rail-joint connection permits of the complete adoption of the rolling allowances current in practice.

One example of the construction of the new rail-joint connection is illustrated in the accompanying drawings, in which Figure 1 is a side elevation, Figure 2 a horizontal section on the line A—A in Figure 1, and Figure 3 is a sectional elevation on the line B—B in Figure 1.

Figure 4:
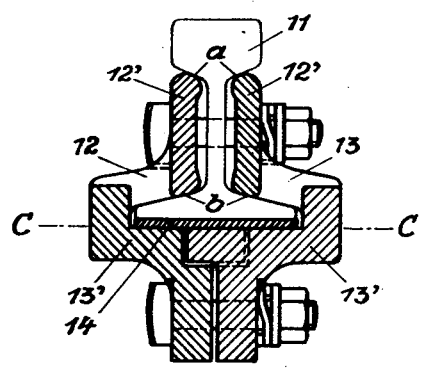
Figure 4 shows another example of construction of the new rail-joint connection in cross section.
Figure 9:
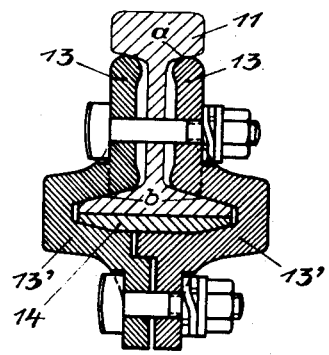
Figure 9 shows a cross-sectional elevation thereof on the line E—E in Figure 7.

The connection between the two rail ends 10 and 11 is effected by means of two pairs of fish plates or splice bars engaging round the rail foot, which each consist of a guiding fish plate 12 and a supporting fish plate 13. The guiding and supporting fish plates are bolted together above and below the rail foot, and the guiding fish plates, clamped into the fish plate seat, and having their upper bearing edges suitably rounded, only bear against the rails at two points $a$ and $b$, as shown in Figures 3, 4 and 9. For the further equalization of the allowances between the bearing surface of the rail foot and the lower flanges of the fish plates, a resilient intermediate layer may be provided, for instance a straight or conically beveled wooden board 14.

In the example of construction illustrated in Figures 1 to 3, the fish plates are so constructed at the ends facing one another that the guiding fish plates 12 comprise above the rail foot, and the supporting fish plates 13 below the rail foot, extensions 12′ and 13′ respectively, which partly project beyond the end of the rail and engage one over the other in the closed position. The projecting parts of the supporting fish-plate extensions 13′ form the medium through which the rail ends bear upon the fish plate halves that for the time being are opposite to the rail ends, whereby the result is obtained that when one rail end is being traversed the pressure is transmitted by the rail foot to the supporting fish plate of the opposite rail end, and the latter is drawn down to the same extent as the other rail end. In this way when a wheel is traversing the rail joint, the two rail ends are sure to be at the same level and the hammer blow effect of the wheels is obviated.

The object of the projecting parts of the guiding fish plate extensions 12′ is to provide lateral support for the fish plates 12 on the rail ends opposite to them, for the purpose of keeping the latter in the same direction and preventing lateral deviation of the rails when a wheel passes over the joint. The prolongations 12′ of the guiding fish plates may be so constructed for this purpose, as illustrated in Figures 1 to 3, as to project so far towards the side facing the web of the rail, as compared with the upper flange of the fish plate, that they are pressed firmly and securely against the webs of both rail ends when the fish plates are bolted together, a stress being at the same time produced, as in the case of the employment of spring rings, which prevents the loosening of the connecting screws.

In order to obtain a reliable connection, acting as a closed unit, notwithstanding the employment of divided fish plates, the associated guiding and supporting fish plates are preferably so connected with one another as to be yielding in a longitudinal direction. This may advantageously be effected in the manner illustrated in Figures 6 to 9 by making the adjacent ends of the guiding and supporting fish plates engage loosely one in the other above the rail foot, in such a way that the claw-like extension 12′ of the guiding fish plate engages with clearance in a groove 15 in the supporting fish plate. Alternatively the end of the supporting fish plate may equally well be constructed as a claw and may engage in a groove in the guiding fish plate. In this manner the fish plate ends are not only connected with one another to form a coherent unit but the connection is of a yielding character so far as is required for relative displacement of the halves of the fish plates for the purpose of compensating for the differences of length arising from expansion or contraction of the rails. Instead of a claw-shaped or hook-shaped connection of the fish plate halves other suitable kinds of connection may be selected.

In the case of railway lines that are traversed in both directions the pairs of fish plates are preferably secured in a reverse arrangement at the rail ends, as illustrated in Figures 2 and 3.

Figure 8:
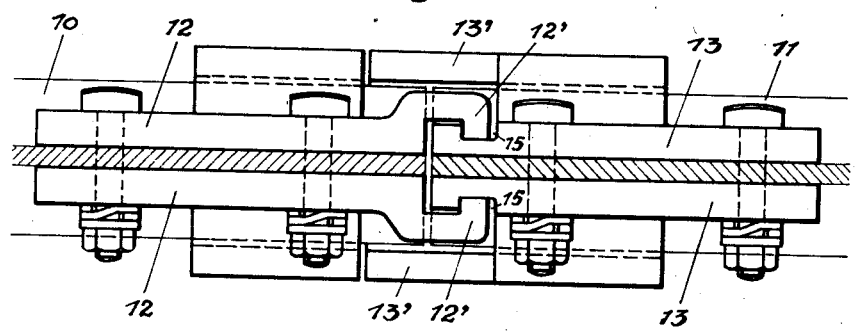
Figure 8 shows this example in horizontal section on the line D—D in Figure 7.

In the case of lines traversed in one direction only, however, the pairs of fish plates may be arranged as illustrated in Figure 8, that is to say, the two guiding fish plates are arranged on one rail end and the two supporting fish plates on the other.

In order to obtain a more advantageous distribution of the forces acting upon the guiding fish plates 12, the extensions 13′ of the two supporting fish plates 13, which catch underneath the rail joint, engage in the guiding fish plates like comb teeth.

Figure 5:
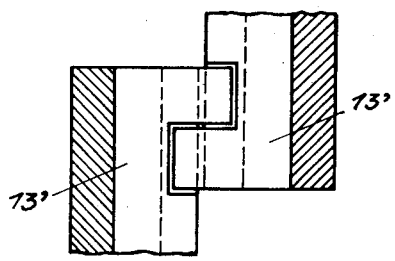
Figure 5 shows this form in horizontal section on the line C—C in Figure 4.
Figure 6:
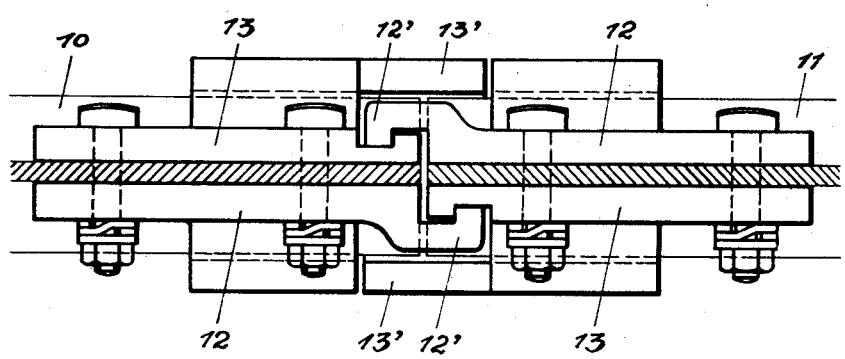
Figure 6 shows a third constructional example in plan, with the rail head cut off.
Figure 7:
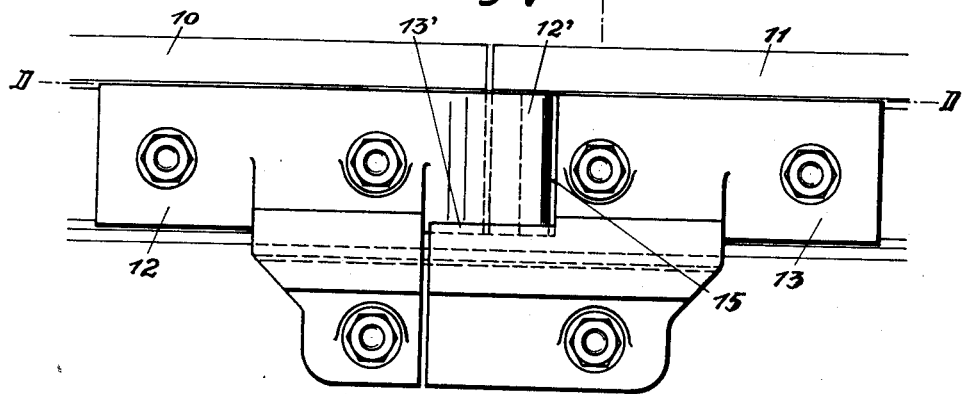
Figure 7 shows a fourth constructional example in side elevation.

In order moreover to prevent displacements of the two rail ends there may be provided on the extensions 13′ of the supporting fish plates projections and recesses engaging one in the other like comb teeth, as illustrated in Figures 4 and 5.

What we claim is:—

1. A rail-joint connection comprising divided splice bars embracing the rail foot, each splice bar consisting of a guiding bar and a supporting bar, an extension on each guiding bar above the rail foot, and an extension on each supporting bar below the rail foot, the said extensions projecting partly beyond the end of the rail to which they are secured, and overlapping one another when the rails are put together to form a joint.

2. A rail-joint connection comprising divided splice bars embracing the rail foot, each splice bar consisting of a guiding bar and a supporting bar, an extension on each guiding bar above the rail foot, and an extension on each supporting bar below the rail foot, the said extensions projecting partly beyond the end of the rail to which they are secured, and overlapping one another when the rails are put together to form a joint, and a longitudinally yielding connection between the guiding bars and the supporting bars.

3. A rail-joint connection comprising divided splice bars embracing the rail foot, each splice bar consisting of a guiding bar and a supporting bar, a claw-shaped extension on each guiding bar above the rail foot, and an extension on each supporting bar, the said extensions projecting partly beyond the end of the rail to which they are secured, and overlapping one another when the rails are put together to form a joint, and the extension on the supporting bar being formed with a groove in which the claw-shaped extension on the corresponding guiding bar is adapted to engage with longitudinal clearance.

4. A rail-joint connection comprising divided splice bars embracing the rail foot, each splice bar consisting of a guiding bar and a supporting bar, and each rail end having a guiding bar secured to it on one side and a supporting bar on the other side, an extension on each guiding bar above the rail foot, and an extension on each supporting bar below the rail foot, and comb-like teeth along the adjacent edges of the extensions of the supporting bars, the said teeth being adapted to interengage below the rail foot when the joint is made.

OTTO REIFURTH.
ALFRED MÖLLER.